Dec. 16, 1952  C. T. PIERMATTEO  2,622,185
HEATING SYSTEM
Filed Feb. 8, 1950  4 Sheets-Sheet 1

Charles T. Piermatteo
INVENTOR.

BY Clarence A. O'Brien
and Harvey B. Jackson
Attorneys

Dec. 16, 1952 — C. T. PIERMATTEO — 2,622,185
HEATING SYSTEM
Filed Feb. 8, 1950 — 4 Sheets-Sheet 2

Charles T. Piermatteo
INVENTOR.

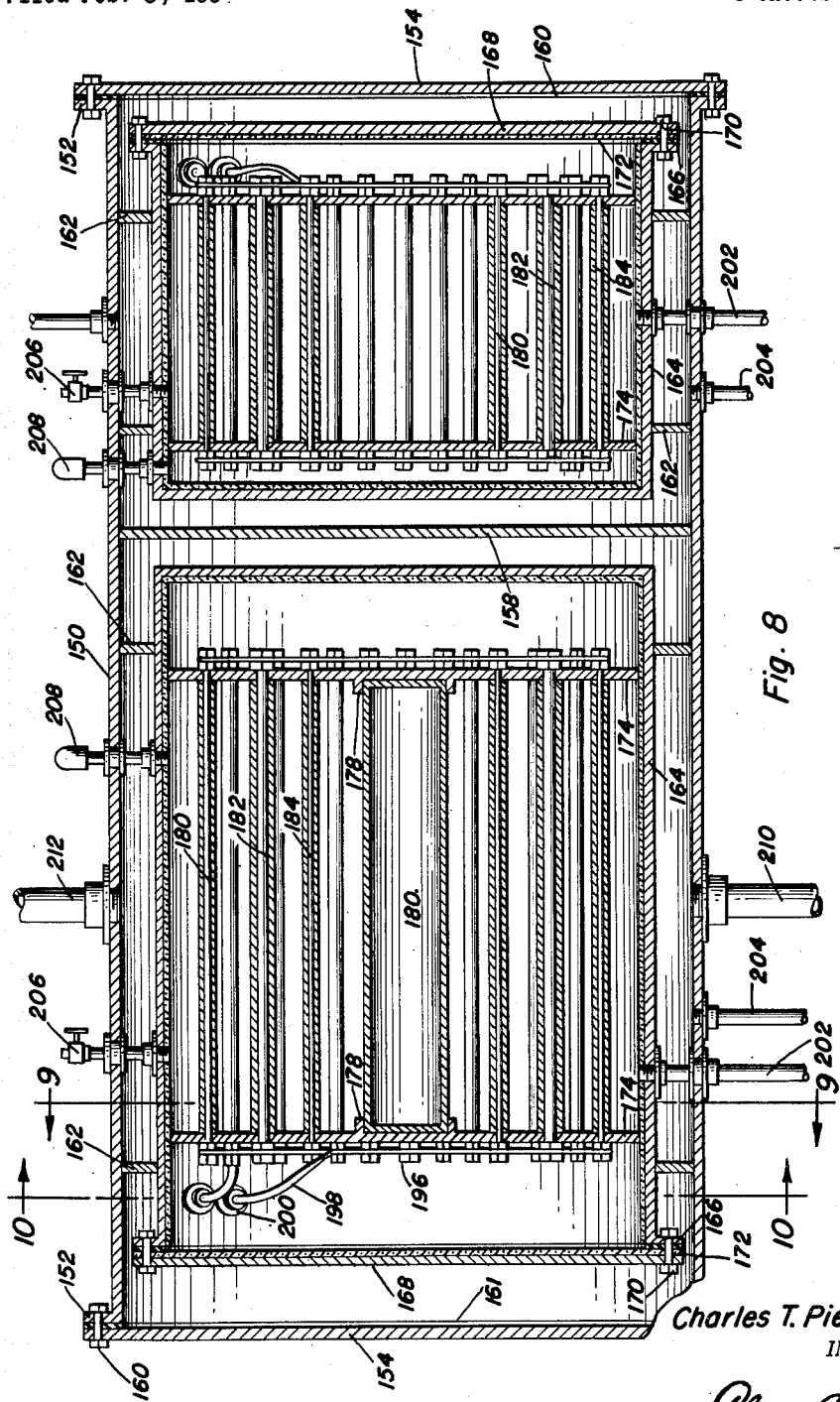

Dec. 16, 1952     C. T. PIERMATTEO     2,622,185
HEATING SYSTEM
Filed Feb. 8, 1950     4 Sheets—Sheet 4
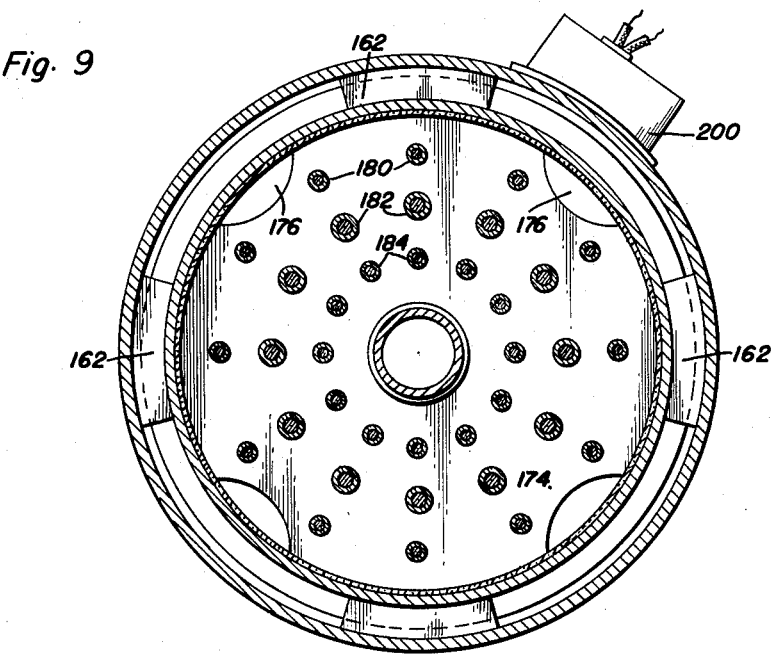
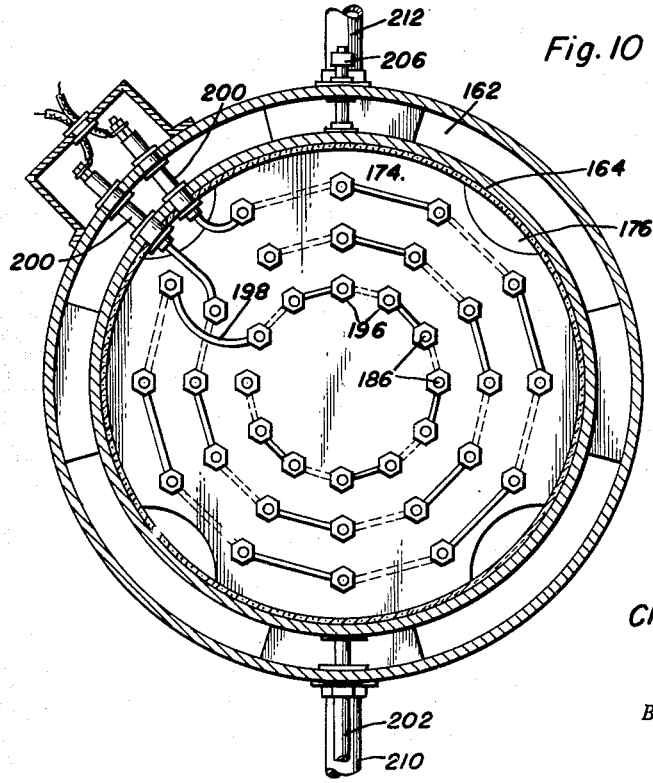
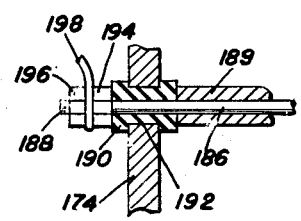
Charles T. Piermatteo
INVENTOR.

Patented Dec. 16, 1952

2,622,185

UNITED STATES PATENT OFFICE 2,622,185

HEATING SYSTEM

Charles T. Piermatteo, Philadelphia, Pa.

Application February 8, 1950, Serial No. 143,063

1 Claim. (Cl. 219—40)

This invention relates to the class of heating and ventilation and more particularly to an electrically operated heater and steam generator.

An object of this invention is to heat fluid and generate steam by the introduction and transmission of electricity through portions of the water to be heated, causing currents in the water to be formed due to the different temperature gradients to cause circulation thereof so that the entire mass of water is brought within the influence of the electrical current and is rapidly and uniformly heated to generate steam therefrom.

A further object of the invention is to provide a simplified heating system which involves no moving parts and which eliminates the use of hazardous combustibles, such as coal, oil and gas.

Yet another object of the invention is to provide a detachable hot water supply unit which can be used together with the main heating element or can, if desired, be used separately.

Yet another object of the invention is to provide a detachable and easily removable heating unit which is adapted to be detachably inserted in a casing to form the complete heating unit.

Still another object of the invention is to provide a heating system which requires a minimum of attention and which can be automatically controlled through the use of suitable thermostatic devices.

Another object of the invention is to provide a heating unit which will have readily replaceable parts which may be readily substituted for worn, used or corroded elements.

Still further objects of the invention reside in the provision of an electrical heating apparatus which is strong, durable, highly efficient and reliable in operation, simple in construction and design, capable of being easily installed and repaired, and which is comparatively inexpensive to operate.

These, together with the various ancillary objects of the invention which will become apparent as the following description proceeds, are attained by this heating apparatus or system, preferred embodiments of which have been illustrated in the accompanying drawings, by way of example only, wherein:

Figure 8 is a vertical sectional view as taken along the longitudinal axis of a further embodiment of heating system;

Figure 9 is a vertical sectional view as taken along 9—9 in Figure 8;

Figure 10 is a vertical sectional view as taken along line 10—10 in Figure 8; and Figure 11 is a vertical sectional detail of the invention showing the means of fork connecting the electrodes to the spaced plates supported within the inner casing.

Figure 1:
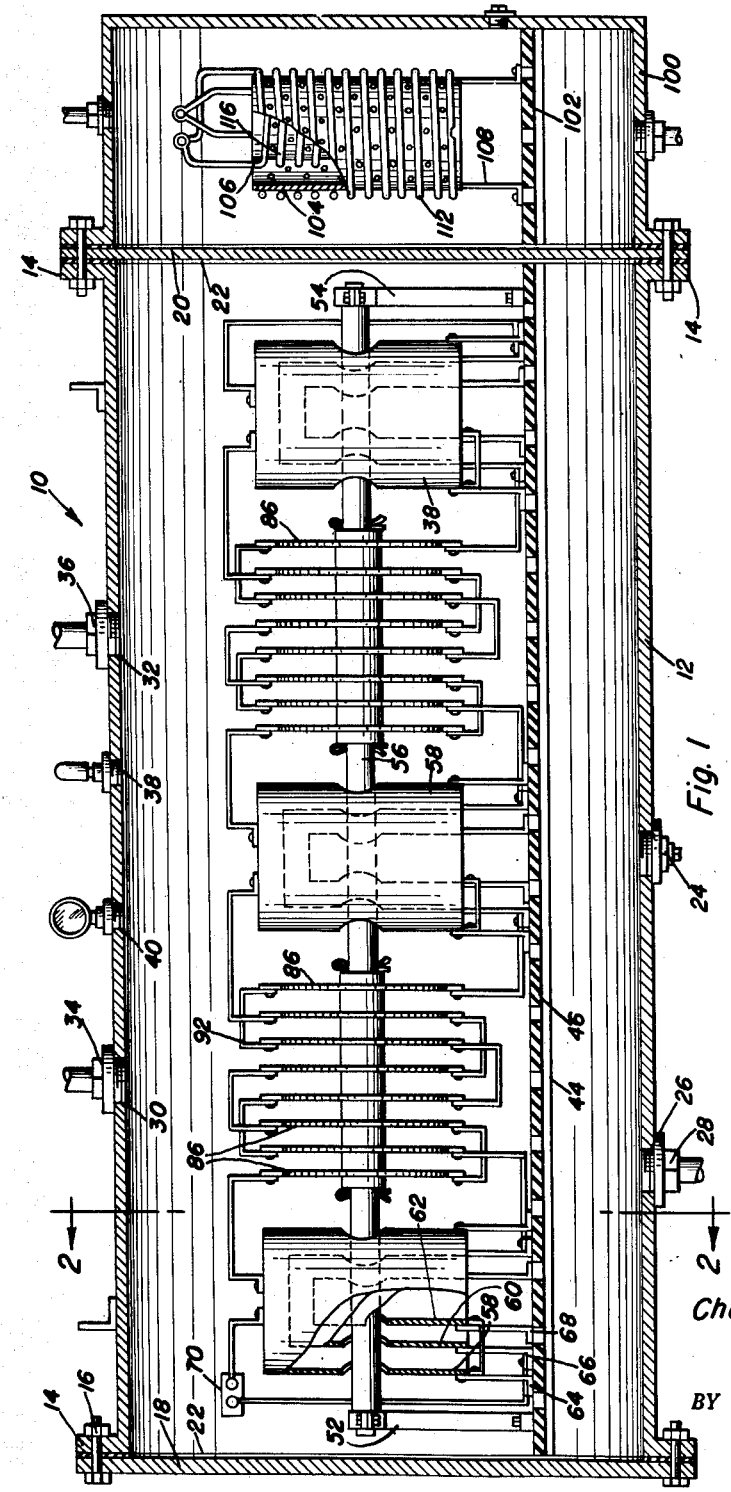
Figure 1 is a side elevational view of the invention, parts throughout being shown in section to show the other parts thereof in greater detail.

With continuing reference to the accompanying drawings wherein like reference numerals designate similar parts throughout the various views, reference numeral 10 generally designates the heating unit or system comprising the present invention which is of the water-resistant type in which water serves as a means for completing an electrical circuit and also as the resistor therefor. Thus, the positive and negative electrodes forming elements of the invention are electrically connected by the resistor which is the water contained within the boiler or casing.

Referring now to the embodiment shown in Figure 1 through 7, reference numeral 12 generally represents a cylindrical casing which may be readily made from a suitable steel properly coated with a layer of porcelain. The casing 12 is formed out of a hollow cylinder having flanges 14 provided with spaced apertures about their circumference through which bolts 16 can be used for securing end walls or covers 18 and 20 to the flanges. Suitable gaskets 22 are used to provide a seal between the flanges and the side walls 18 and 20.

A threaded drain plug 24 is provided in the bottom of the tank for draining and flushing the heating system. Near one end of the casing 12 there is provided a threaded opening 26. Threadedly secured within the opening 26 is a suitable connecting element 28 which is used for connecting a fluid supply system to the casing for selectively filling the casing with water. The members 28 comprise suitable insulating material so that there is no metal-to-metal contact between the casing 12 and the connected piping. Reference numerals 30 and 32 generally designate a pair of threaded openings for the passage of hot water under natural circulation or for the passage of steam as desired. The connectors 34 and 36 which are engaged within these openings 30 and 32 are also of hard, insulative materials.

A pressure relief or safety valve is secured within an opening 38 and an opening 40 for a combined water gauge, thermometer and thermostat is secured within opening 40.

A pair of plates 42 and 44 are secured to the inner surface of the casing 12 and extend longitudinally therewith. An apertured base plate 46 is secured upon the plates 42 and 44 and is detachably held in place by bolts 48. The base plate 46 is preferably of a hard insulative material and the perforations 50 formed therein are for passage of water to enhance the circulation thereof and also for the passage of foreign matter, such as scale, and the like, to the bottom of the casing, where it may be readily drained and flushed therefrom.

On the base 46 are mounted and secured the brackets 52 and 54 which support a longitudinally extending insulative rod 56.

Supported on the rod 56 are sets of concentric electrodes 58, 60 and 62 which are provided with apertured plates to allow for free circulation of heated water. The electrodes 58, 60 and 62 are supported in spaced relation from the plate 46 by legs 64, 66, and 68, respectively.

Figure 6:
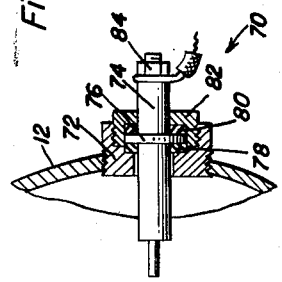
Figure 6 is a vertical sectional view of a binding post used to connect and extend suitable conductors through the outer casing of the heating apparatus.
Figure 5:
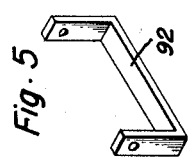
Figure 5 is a perspective view of a connector used to connect adjacent electrodes.
Figure 4:
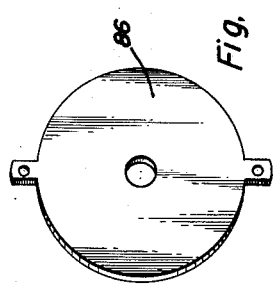
Figure 4 is a perspective view of one of the disk electrodes.
Figure 2:
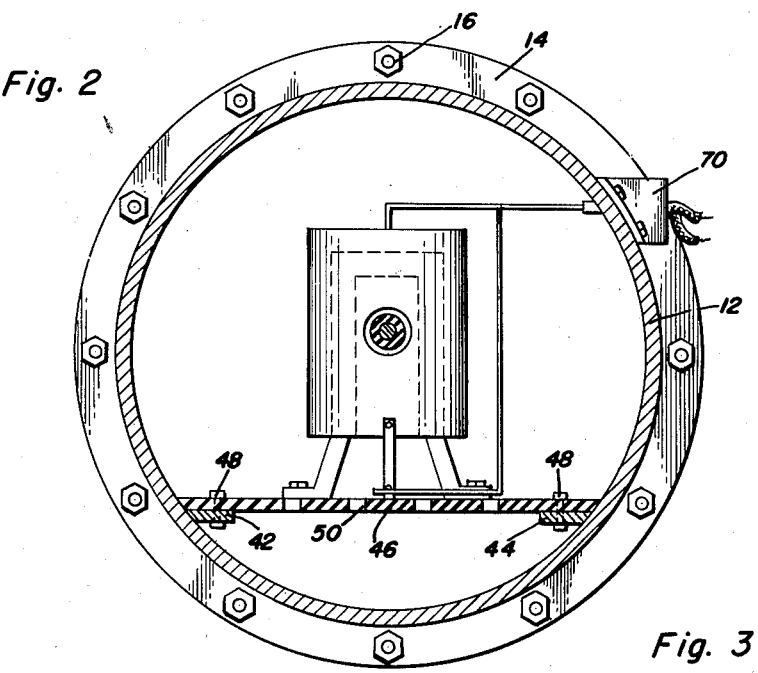
Figure 2 is a vertical sectional view as taken along line 2—2 in Figure 1.
Figure 3:
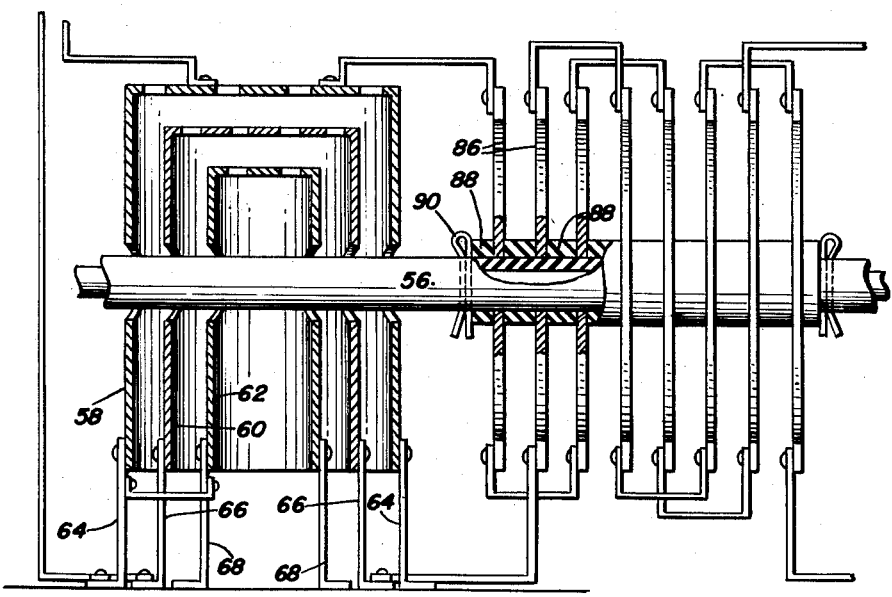
Figure 3 is an enlarged elevational view of a portion of the invention showing the electrodes in greatest detail, with parts thereof being broken away and shown in section to show other parts more clearly.
Figure 7:
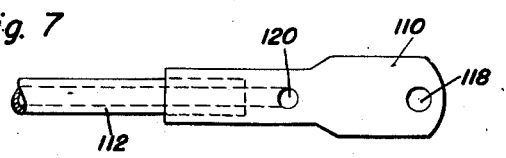
Figure 7 is an elevational view of a connector forming one portion of an electrode used in this invention.

The electrodes are connected through suitable conductors to a source of electrical power outside of the casing. The conductors extend through the binding posts 70 which are secured to the casing and which are best illustrated in Figure 6. The binding posts 70 comprise a bushing 72 threadedly secured to the casing 12. A porcelain lined insulative sheath 74 having a collar 76 formed thereon is positioned in the bushing 72. A pair of gaskets 78 and 80 are positioned on either side of the collar 76 about the sheath 74 and by means of a compression gland nut 82, the sheath is made fast to the bushing 72. The conductors extend through the sheath 74 and are held by bolts 84 and connected to an outer conductor which is connected to the source of power. A plurality of disk-type electrodes 86 are secured about the rod 56 in spaced relation and are held in the spaced relation by tubular sleeves 88 of insulative material. Each of these sleeves 88 is positioned between adjacent electrodes 86 and on either side of the electrode 86. A cotter pin 90 passing through the rod 56 is used to hold the entire disk electrode assembly in its predetermined and proper place. A plurality of U-shaped conductive elements 92 connect alternate disk electrodes 86 and other conductors are used to connect the disk electrodes 86 to the legs 64, 66 and 68 to provide operative electrical circuits between the disk electrodes.

Secured to the flange 14 is a domestic hot water heating unit which comprises a casing 100 which has a base 102 suitably mounted thereon. A pair of apertured cylinders 104 and 106 are secured to the base in spaced relation therewith by legs 108. By means of elements 110, spiral conductors 112 and 116 which are formed from hollow tubing are operatively emplaced about the cylinders 104 and 106, respectively. The members 110 comprise conductors having apertures 118 for connecting the suitable electrical conductors which are connected to the outside power supply to the members 110. Further, the members 110 are provided with apertures 120 for providing passage of water into the tubular elements 112 and 116. In this manner, heating surface for each of the electrodes is obtained and a large amount of water may be readily and easily heated thereby. The purpose of the various configurations of the electrodes is to provide varying temperatured gradients within the casing 12 so that currents may be induced to cause ready and even heating of the water in the casing. In order to form steam, it is merely necessary to pre-set the valve in the opening 38 to the desired steam pressure and fill the casing 12 half way full. The water between the electrodes closes an operative electrical circuit and acts as a resistant to cause the columns and portions of water between the electrodes to heat rapidly.

Referring now to the form of the invention shown in Figures 8 through 11 of the drawings, reference numeral 150 is used to designate a casing having flanges 152 formed at the ends thereof to which end walls 154 may be readily secured to form a suitable tank which may be readily suspended and secured in any convenient manner. Like the embodiment shown and described in Figures 1 through 7, the tank used in this embodiment of the invention is of the type that is adapted to be suspended from a suitable structure, since it is light and compact in design.

The tank is divided into two separate compartments by a plate 158. Gaskets 160 are provided to insure the water tightness of the connections between the flanges 152 and plates 154. Hinge bolts 161 are used to detachably secure the end plates 154 to the flanges 152, and either end plate 154 may be readily removed to provide access to a desired compartment.

Within each of the compartments formed by the plate 158 there is suspended by means of plates 162 inner casings 164 which vary from each other only in size, the larger casing being positioned in the larger compartment and used for supplying the heating system, while the smaller casing is used for the domestic hot water supply. Each of the casings 164 is preferably of porcelain covered metallic structure and provided with flanges 166 at the open end on which plate 168 may be detachably secured, using bolts 170 and gasket 172 to effect a water-tight seal. Secured to the casing 164 and insulated therefrom are supporting walls 174 which are formed with radially spaced openings 176 through which water may readily flow. An inner annular flange 178 may optionally be formed on the plates 174 in the center thereof for supporting a central void tank 180 to decrease the amount of water between electrodes which are used to heat the water. The electrodes are formed in concentric rings which are generally designated by reference numerals 180, 182 and 184, the rings 180 and 184 of electrodes being the outer and inner rings, and the ring 182 being the intermediate ring. The outer rings 180 and the inner ring 184 are connected to a terminal of the electrical power source through suitable conductors. The intermediate ring of electrodes 182 is connected to the other terminal of the power source. In order to make the electron emitting and receiving surfaces of the electrodes equal, the intermediate electrode 182 is formed with the outer area thereof equal to the outer area of the sum of the outer areas of the inner and outer rings of electrodes. Each of the electrodes comprises a copper shaft 186 which extends through the walls 174 and which is threaded at its ends as at 188. A suitable annular gasket 190 of insulative material is positioned within apertures 192 formed in the walls 174 through which the shafts 186 extend. Tubular carbon elements 189 are positioned concentric with the shaft 186 thereabout between the opposed walls 174. Nuts 194 are then secured on the shaft 186 in order to secure and rigidly hold the walls 174 and the electrodes in a spaced relationship. Then by means of nuts 196, conductors 198 may be connected to the shafts 186. The conductors 198 are electrically connected to a source of power through insulative binding posts 200 similar to the insulative binding posts 70. Further, it is within the contemplation of the invention to use other suitable binding posts for this object. The binding posts 200 pass through the outer casing 150 and into the inner casing 164.

In the operation of this form of the invention, water is permitted to enter the inner and outer tanks of both compartments through the inlet pipe connections 202 and 204 after the tank has been bled for accumulated air therein by bleeder valves 206. With the system filled with water, an electric current under automatic temperature control is applied on the positive and negative carbon electrodes 188 through the rods 186 and conductors 198. The resulting reaction due to the resistance set up by the water content quickly heats the water surrounding the electrodes to a temperature just below the boiling point, at which time the automatic temperature control cuts in to open the circuit. At the same time, the heat generated within the inner tanks 164 is rapidly transmitted through the walls of the inner tanks to the water spaces between the outer casing 150 and the inner tanks 164. By the natural forced circulation, heat is carried from the outer tanks to piping connected for a domestic hot water supply. When the water in the outer tank has reached a predetermined temperature, a suitable combination temperature control device cuts in to break the circuit in both compartments. As the water cools in the outer tanks, the control switch cuts in again to close the circuit. In order to insure safe operation, the units are separately connected with excess pressure relief valves 208 which are pre-set as desired. These valves 208 protect the system if the control system fails to operate. The automatic temperature control device is not shown and may be any one of the conventional thermostatic devices which may be secured in any desired place within the casing 150. Further, it should be noted that there is no electric connection between the water within the inner casings 164 and between the casing 164 and the outer casing 150. To supplement any of the water which may be lost due to leaks or of operation, a constant flow is insured by supplying the water under pressure through the pipes 202 and 204 as desired. The return main 210 from the radiators is secured to the bottom of the tank casing 150 and the outlet members 212 are secured likewise to the casing 150.

Since, from the foregoing, the construction and advantages of these forms of heating systems are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be resorted to which fall within the scope of the appended claim.

Having described the invention, what is claimed as new is:

An apparatus for heating fluids and generating steam comprising a cylindrical casing, means secured in said casing for supporting a plurality of electrodes, and a plurality of electrodes secured to said means, said electrodes being operatively secured to a source of electrical power, each of said electrodes comprising a cylinder having a hollow spiral tube wrapped thereupon.

CHARLES T. PIERMATTEO.

REFERENCES CITED

The following references are of record in the file of this patent:

UNITED STATES PATENTS

| Number | Name | Date |
|---|---|---|
| 1,087,887 | Nichols | Feb. 17, 1914 |
| 1,265,554 | Valdes | May 7, 1918 |
| 1,527,762 | Unland | Feb. 24, 1925 |
| 2,058,054 | Bidwell | Oct. 20, 1936 |
| 2,404,336 | Wicks | July 16, 1946 |
| 2,430,347 | Lamphier | Nov. 4, 1947 |
| 2,453,776 | Beath et al. | Nov. 16, 1948 |

FOREIGN PATENTS

| Number | Country | Date |
|---|---|---|
| 423,014 | Great Britain | Jan. 23, 1935 |